UNITED STATES PATENT OFFICE.

IWAO SUZUKAWA, OF HIROSHIMA, JAPAN.

PAINT FOR COATING THE BOTTOMS OF VESSELS.

1,315,748.      Specification of Letters Patent.      Patented Sept. 9, 1919.

No Drawing.      Application filed January 26, 1918. Serial No. 213,901.

*To all whom it may concern:*

Be it known that I, IWAO SUZUKAWA, subject of the Emperor of Japan, residing at No. 78 Minami Takeya Cho, in the city of Hiroshima, Hiroshima Ken, Japan, have invented new and useful Improvements in Paint for Coating the Bottoms of Vessels, of which the following is a specification.

This invention relates to paint for coating the bottoms of vessels and consists in mixing a solution in benzol of a compound of an alkaloid, such as quinin, strychnin or the like and phenol with a metal soap and a metal powder formed by subjecting fatty acid and an oxid of a heavy metal to a high heat, and adding thereto resin, turpentine oil and any desired pigment. The object of my invention is to obtain a paint which while not freely dissolving in sea water, gives out sufficient poison to kill the sea weeds and shells that may adhere to the bottoms of vessels and thus protects them from fouling.

The following is an example of carrying my invention into practice:—

Dissolve a measured quantity of quinin sulfate in water and add thereto a solution of an alkali which causes the quinin to precipitate. Put 10 parts of the precipitated quinin in 20 parts solution of carbolic acid, and heat the mixture slowly in a water bath for three hours, stirring it now and then, thus causing the quinin and the carbolic acid to combine and form phenol ester. The phenol ester formed in this way is one having the molecular formula of $C_6H_5OC_{20}H_{24}(NO)_2$, and although it is insoluble in water, it can be easily decomposed into carbolic acid and soluble quinin salt, if from any cause its acidity be increased. If strychnin is used instead of quinin, the resulting phenol ester will have the molecular formula of $C_6H_5O.C_{21}H_{22}(NO)_2$. Remove the water from the phenol ester thus obtained by slow evaporation, and prepare a fluid by dissolving 20 parts thereof in 100 parts of benzol. Then take stearic or oleic acid and add thereto about equal quantity by weight of a poisonous heavy metal oxid, such as lead oxid or zinc oxid, or the like, and subject the mixture for about one hour to a heat of about 400° C. A metal soap is thus formed and at the same time part of the metal oxid will be reduced into the fine metallic powder, the superheated fatty acid giving out reducing gases such as hydrocarbon. Then carefully mix 55 parts of this metal soap containing fine metal powder with 100 parts of the phenol compound of quinin mentioned above and add thereto 20 parts of resin, 180 parts of turpentine and 45 parts of any suitable pigment. Mix well the whole by stirring, and a paste-like paint will be formed. The pigment generally used in my invention is iron oxid, but copper oxid, mercuric oxid or aluminium silicate may sometimes be used.

It is well known that it is comparatively difficult to dissolve in water quinin sulfate of the formulæ $Q_2H_2SO_4.8Aq$ and $Q.H_2SO_4.7Aq$, and for that reason applicant uses generally $Q.(H_2SO_4)_2.7Aq$; or, soluble quinin sulfate.

The metal powder referred to herein is formed by overheating a mixture of metallic oxid and fatty acid, whereby the fatty acid becomes saponified, while at the same time it cracks and gives out reducing gas which reduces the metal oxid and forms a fine metallic powder.

In this invention the phenol ester and alkaloid slowly decomposing in the sea water gives out a special kind of poison and kills the germs of shells and sea weeds, and if any shells or sea weeds happen to incrust the bottom, the metal soap and metal powder slowly freeing poison exterminate them. Thus, the paint of my invention most effectively protects the bottom of the ship from fouling and considerably lengthens its life.

I claim:

1. A paint for coating the bottoms of vessels which is formed by thoroughly mixing phenol ester miscible in oil obtained by slowly heating a mixture of phenol and alkaloid, with heavy metal soap and fine metal powder obtained by subjecting a mixture of oxid of a heavy metal and fatty acid to a high heat, to which is added varnish or paint vehicle, substantially as and for the purposes as herein described.

2. A paint for coating the bottom of vessels which consists in mixing phenol ester miscible in oil obtained by slowly heating a mixture of alkaloid and phenol, with metal soap and metal powder formed by subjecting a mixture of fatty acid and oxid of a heavy metal to a high heat, and in adding thereto resin, volatile solvent and pigment, substantially as and for the purposes herein described.

In testimony whereof I have signed my name to this specification in the presence of two subscribing witnesses.

IWAO SUZUKAWA.

Witnesses:
Yoshika Ikeda,
Makutato Mochiguki.